United States Patent
Nakabe

(10) Patent No.: US 12,288,251 B2
(45) Date of Patent: Apr. 29, 2025

(54) MANAGEMENT SERVER, AND CONTROL METHOD OF MANAGEMENT SERVER

(71) Applicant: HONDA MOTOR CO., LTD., Tokyo (JP)

(72) Inventor: Kazutaka Nakabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 18/159,804

(22) Filed: Jan. 26, 2023

(65) Prior Publication Data
US 2023/0274344 A1 Aug. 31, 2023

(30) Foreign Application Priority Data
Feb. 28, 2022 (JP) ................................. 2022-029244

(51) Int. Cl.
*G06Q 30/00* (2023.01)
*B60L 58/12* (2019.01)
*G06Q 30/0645* (2023.01)

(52) U.S. Cl.
CPC .......... *G06Q 30/0645* (2013.01); *B60L 58/12* (2019.02)

(58) Field of Classification Search
CPC .... G06Q 30/0645; G06Q 30/06; G06Q 50/10; G06Q 50/06; B60L 58/12; B60L 50/66; B60L 53/305; B60L 53/65; B60L 53/68; B60L 53/80; G07F 17/0042
See application file for complete search history.

(56) References Cited

U.S. PATENT DOCUMENTS

2020/0408549 A1* 12/2020 Oshima ................... H02J 50/90
2021/0004882 A1* 1/2021 Nakajima .............. G06Q 50/10
(Continued)

FOREIGN PATENT DOCUMENTS

JP 6882588 B1 6/2021

OTHER PUBLICATIONS

Uncovering the Source of Machine Bias, Hu, Xiyang; Huang, Yan; Li, Beibei; Lu, Tian. IDEAS Working Paper Series from RePEcSt. Louis: Federal Reserve Bank of St. Louis. (2022) (Year: 2022).*
(Continued)

*Primary Examiner* — Matthew T Sittner
(74) *Attorney, Agent, or Firm* — Rankin, Hill & Clark LLP

(57) ABSTRACT

A management server that manages lending and borrowing of a battery detachably provided in a moving body includes a lending management unit configured to determine an approval mode, which is one of an approval unnecessary mode in which permission for borrowing is granted to a borrower without receiving approval of a lender and an approval necessary mode in which permission for the borrowing is granted to the borrower after receiving approval of the lender, on the basis of designation by the lender or a predetermined condition allowed by the lender, and a borrowing permission granting unit configured to grant permission for the borrowing to the borrower by transmitting information necessary for borrowing of the battery to second electronic equipment, and the borrowing permission granting unit grants permission for the borrowing to the borrower in accordance with the approval mode determined by the lending management unit.

6 Claims, 13 Drawing Sheets

(56) References Cited

U.S. PATENT DOCUMENTS

2021/0248535 A1\* 8/2021 Ikui ................... H01M 50/258
2022/0185591 A1\* 6/2022 Boeker ............... H02J 7/00045

OTHER PUBLICATIONS

A DApp Architecture for Personal Lending on Blockchain, Uriawan, Wisnu; Wahana, Agung; Slamet, Cepy; Suci Asih, Vemy. Proceeding of 2021 7th International Conference on Wireless and Telematics, ICWT 2021Institute of Electrical and Electronics Engineers Inc. (2021) (Year: 2021).\*

Blockchain Empowered Framework for Peer to Peer Lending, Arora, Nisha; Kaur, Pankaj Deep. 2021 9th International Conference on Reliability, Infocom Technologies and Optimization (Trends and Future Directions) (ICRITO): 5 . IEEE. (2021) (Year: 2021).\*

\* cited by examiner

MANAGEMENT SERVER, AND CONTROL METHOD OF MANAGEMENT SERVER

INCORPORATION BY REFERENCE

The present application claims priority under 35 U.S.C. § 119 to Japanese Patent Application No. 2022-029244 filed on Feb. 28, 2022. The content of the application is incorporated herein by reference in its entirety.

BACKGROUND OF THE INVENTION

Field of the Invention

The present invention relates to a management server, and a control method of the management server.

Description of the Related Art

In recent years, a battery has been used for the purpose of expanding a ratio of renewable energy, because power charged by renewable energy can be used at locations other than a charging location. Further, a technique using a battery has been proposed in related art (see, for example, Japanese Patent No. 6882588). Japanese Patent No. 6882588 discloses an electric vehicle including a body battery attached to a vehicle body, and a drive source outputting driving force for traveling using power of the body battery, the electric vehicle detachably holding a user battery possessed by a user separately from the body battery, a holder having a function of charging the user battery being provided in the vehicle body.

In related art, there is a possible rental system in which a user who possesses a user battery (hereinafter, referred to as a "lender") lends the user battery to a user of a third party (hereinafter, referred to as a "borrower").

Further, by this rental system including a mechanism in which the borrower can borrow the user battery by extracting the user battery from a holder of an electric vehicle of the lender, the lender can lend the user battery at a lending location where the lender arrives as a result of moving by the electric vehicle, so that it is possible to improve user-friendliness of the lender.

Further, in a case where the lender desires to temporarily cancel lending of the user battery that is to be lent, for example, because the lender himself/herself uses the user battery, if the lender can easily control lending, it is possible to further improve user-friendliness of the lender.

The present invention is directed to providing a management server that can improve user-friendliness of the lender and a control method of the management server.

SUMMARY OF THE INVENTION

One aspect of the present invention is a management server that manages lending and borrowing of a battery between a lender who lends the battery and a borrower who borrows the battery, the battery being detachably provided in a moving body, the management server including: a lending management unit configured to determine an approval mode on the basis of designation by the lender or a predetermined condition allowed by the lender, the approval mode being one of an approval unnecessary mode in which permission for borrowing is granted to the borrower without receiving approval of the lender and an approval necessary mode in which the permission for borrowing is granted to the borrower after receiving the approval of the lender; and a borrowing permission granting unit configured to, in a case where a request for borrowing of the battery is received from second electronic equipment operated by the borrower, grant permission for the borrowing to the borrower by transmitting information necessary for borrowing of the battery to the second electronic equipment, in which the the borrowing to the borrower after receiving approval of the lender or without receiving approval of the lender in accordance with the approval mode determined by the lending management unit.

According to one aspect of the present invention, it is possible to improve user-friendliness of the lender.

DETAILED DESCRIPTION OF THE PREFERRED EMBODIMENTS

An embodiment of the present invention will be described below with reference to the drawings.

Figure 1:
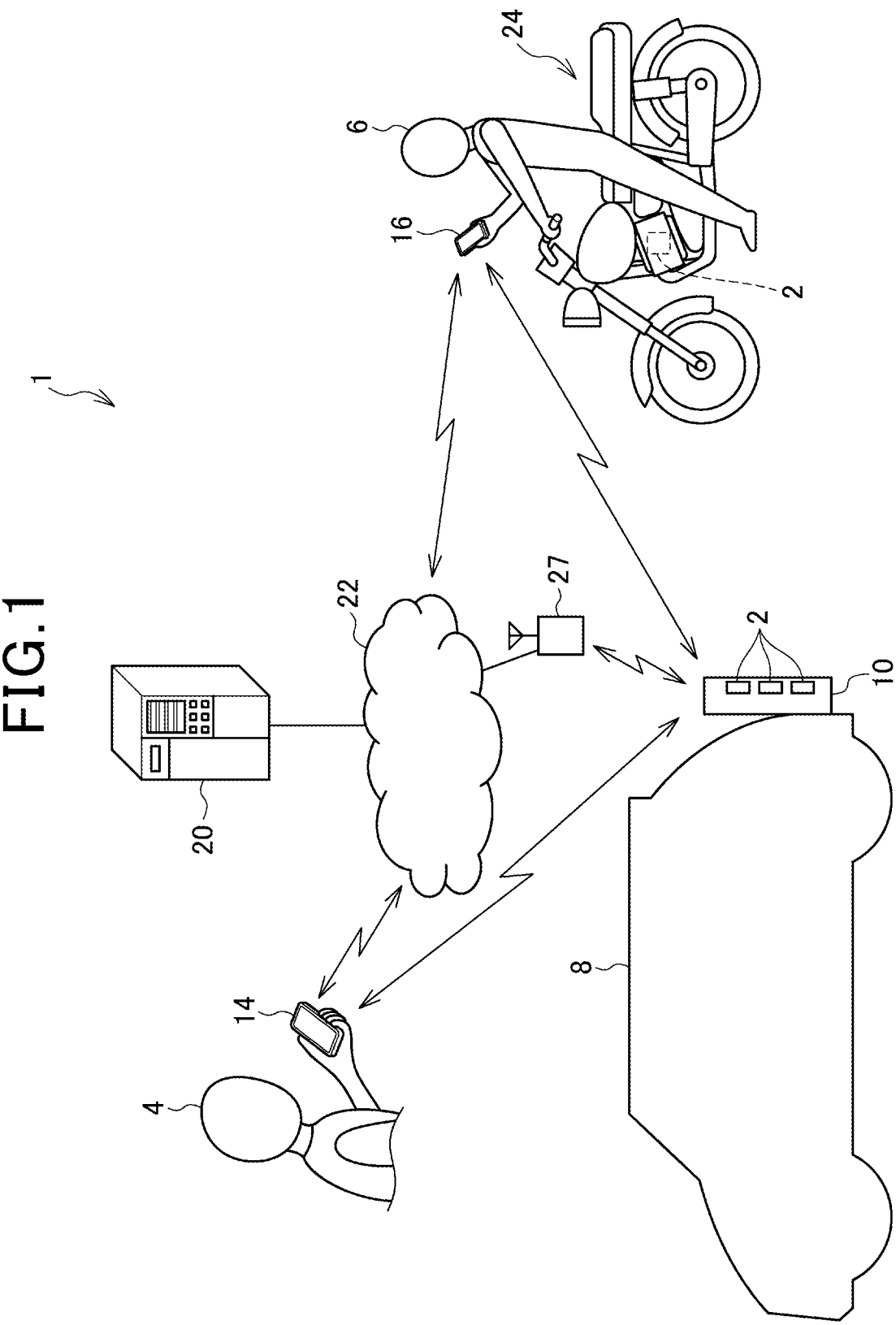
FIG. 1 is a view illustrating a configuration of a rental system according to an embodiment of the present invention.

FIG. 1 is a view illustrating a configuration of a rental system 1 according to the present embodiment.

The rental system 1 is a system that provides a lending and borrowing service of a power pack 2 between a lender 4 who lends the power pack 2 that is a portable battery and a borrower 6 who borrows the power pack 2. As illustrated in FIG. 1, the rental system 1 of the present embodiment includes a battery station 10 that is provided in a moving body 8 operated by the lender 4, the battery station 10 detachably holding the power pack 2, first electronic equipment 14 operated by the lender 4, second electronic equipment 16 operated by the borrower 6, an electric vehicle 24 which is one example of equipment for which the power pack 2 borrowed by the borrower 6 is to be utilized, and a management server 20 that manages lending and borrowing of the power pack 2, and each of the battery station 10, the first electronic equipment 14, the second electronic equipment 16, the electric vehicle 24 and the management server 20 is connected to a communication network 22 such as the Internet so as to be able to perform communication.

The lender 4, who has right to lend the power pack 2 to a third party, is, for example, an owner of the power pack 2 or a person who has right to sublease the power pack 2 borrowed from a business operator of the rental system 1. The lender 4 of the present embodiment also has property right or right of use of the moving body 8.

The moving body 8, which is an object that moves on the ground, in the air, at sea or under water along with the battery station 10 by operation by the lender 4, for example, includes a vehicle, an air vehicle, a ship, and the like. In the present embodiment, an electric four-wheeled vehicle which is one aspect of the vehicle will be described as an example of the moving body 8.

The power pack 2 is a portable battery that is detachably provided in the moving body 8 by being detachably held by the battery station 10 and includes any type (material of electrodes) of battery.

The borrower 6 refers to a person who has right to use the power pack 2 by borrowing the power pack 2 from the lender 4. The borrower 6 of the present embodiment is a user of the electric vehicle 24.

The electric vehicle 24 is a vehicle such as a two-wheeled vehicle, a three-wheeled vehicle, a four-wheeled vehicle, or the like, including the power pack 2 provided so as to be freely exchangeable, and a motor that outputs driving force for driving a drive wheel of a vehicle body by power of the power pack 2.

The management server 20, which is a server computer that provides the lending and borrowing service, manages lending and borrowing of the power pack 2 between the lender 4 and the borrower 6.

The first electronic equipment 14 and the second electronic equipment 16 are both equipment corresponding to a client computer that receives provision of the lending and borrowing service from the management server 20. In other words, the first electronic equipment 14 executes processing related to lending of the power pack 2 with respect to the management server 20 on the basis of operation by the lender 4, and the second electronic equipment 16 executes processing related to borrowing of the power pack 2 with respect to the management server 20 on the basis of operation by the borrower 6.

The first electronic equipment 14 and the second electronic equipment 16 are, for example, portable electronic equipment such as a smartphone and a notebook personal computer or stationary electronic equipment such as a desktop personal computer.

Here, the lending and borrowing service in the rental system 1 of the present embodiment assumes the following first to fourth items.

The first item is that the lender 4 lends the power pack 2 at a current location of the moving body 8 as a lending location.

The second item is that when the borrower 6 borrows the power pack 2, the borrower 6 exchanges the borrowed power pack 2 for the power pack 2 that is being used in the electric vehicle 24 (so-called exchange method).

The third item is that in a case where the power pack 2 is exchanged by the borrower 6, the lender 4 can lend the power pack 2 acquired through exchange. In other words, the lender 4 has right to sublease the power pack 2 acquired through exchange.

The fourth item is that the lender 4 can receive an incentive in accordance with a lending record of the power pack 2 from a business operator of the rental system 1, or the like.

According to such a rental system 1, the lender 4 can lend the power pack 2 also at a location (such as, for example, a shopping mall) where the lender 4 arrives by moving by the moving body 8 as well as home of the lender 4. Further, the lender 4 can receive an incentive by repeatedly lending the power pack 2 without the number of times of lending being limited to a quantity of stock.

On the other hand, in a case where a remaining battery level of the power pack 2 of the electric vehicle 24 becomes less, the borrower 6 can borrow the power pack 2 from the lender 4 who lends the power pack 2 around the borrower 6 and can exchange the power pack 2 for the power pack 2 of the electric vehicle 24. This can solve a problem of shortage of the remaining battery level by exchanging the power pack 2 borrowed from the lender 4 for the power pack 2 even in a case where the remaining battery level of the power pack 2 becomes insufficient when the borrower 6 is travelling by the electric vehicle 24 in a region where facilities for charging are not sufficiently provided.

A configuration of each unit of the rental system 1 will be described in detail next.

Figure 2:
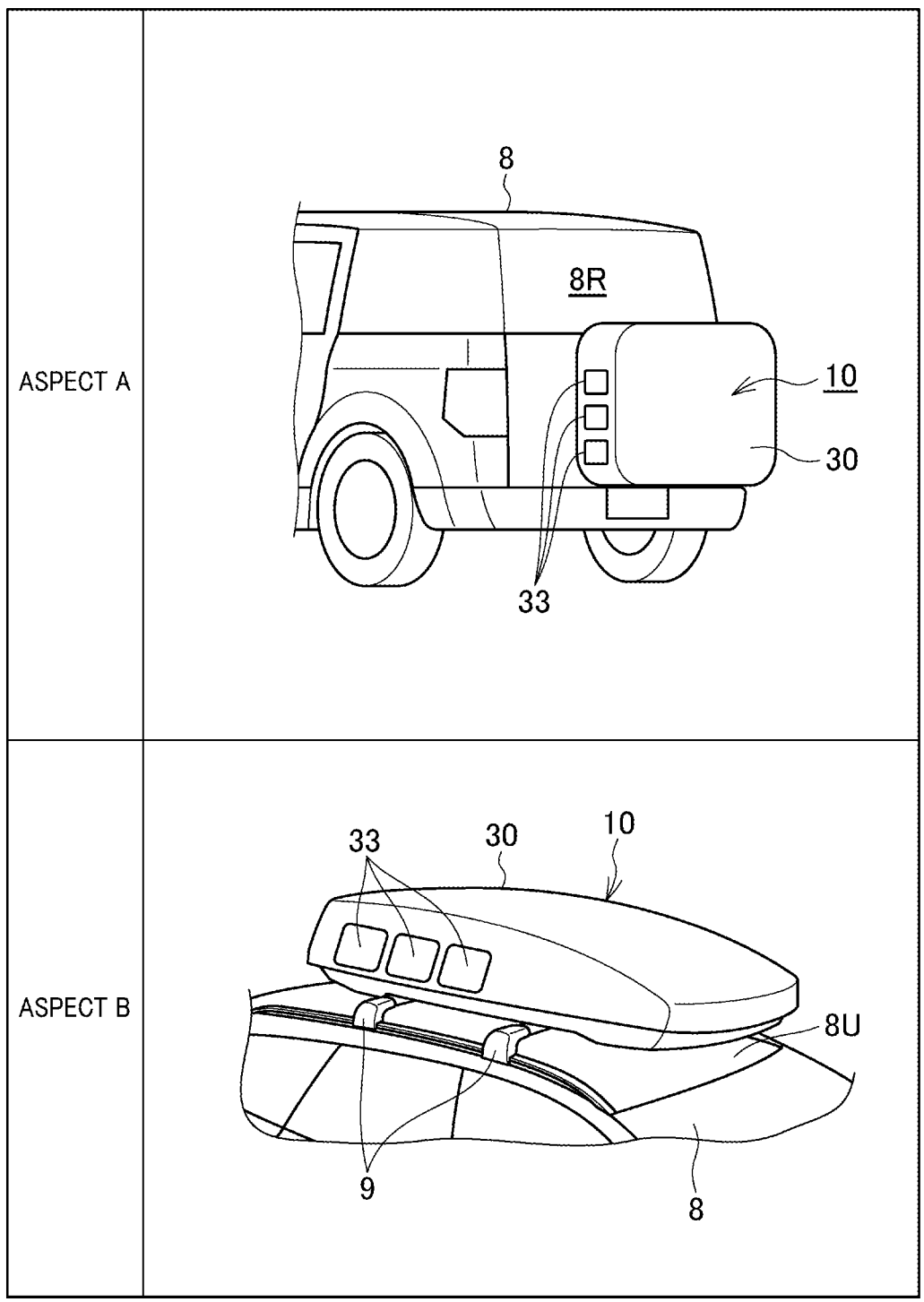
FIG. 2 is a view illustrating an aspect where a battery station is attached to a moving body.

FIG. 2 is a view illustrating an aspect where the battery station 10 is attached to the moving body 8.

As described above, the moving body 8 of the present embodiment is an electric four-wheeled vehicle, and an aspect where the battery station 10 is attached to the moving body 8 includes an aspect A and an aspect B illustrated in FIG. 2. The aspect A is an aspect where the battery station 10 is provided at a location where a spare tire (so-called rear surface tire) is fixed on a rear surface 8R of the vehicle body of the moving body 8. The aspect B is an aspect where the battery station 10 is fixed at a roof carrier 9 provided on a roof 8U of the vehicle body of the moving body 8 in place of a roof box. A size, a shape and appearance of the battery station 10 are different for each of the aspect A and the aspect B, and the battery station 10 in the aspect A has a box shape having a size corresponding to the spare tire, and the battery station 10 in the aspect B has an external shape similar to an external shape of the roof box.

In either the aspect A or the aspect B, the battery station 10 is provided at a position outside the vehicle body of the moving body 8, so that the borrower 6 can visually confirm the battery station 10 and the borrower 6 can easily extract the power pack 2.

Figure 3:
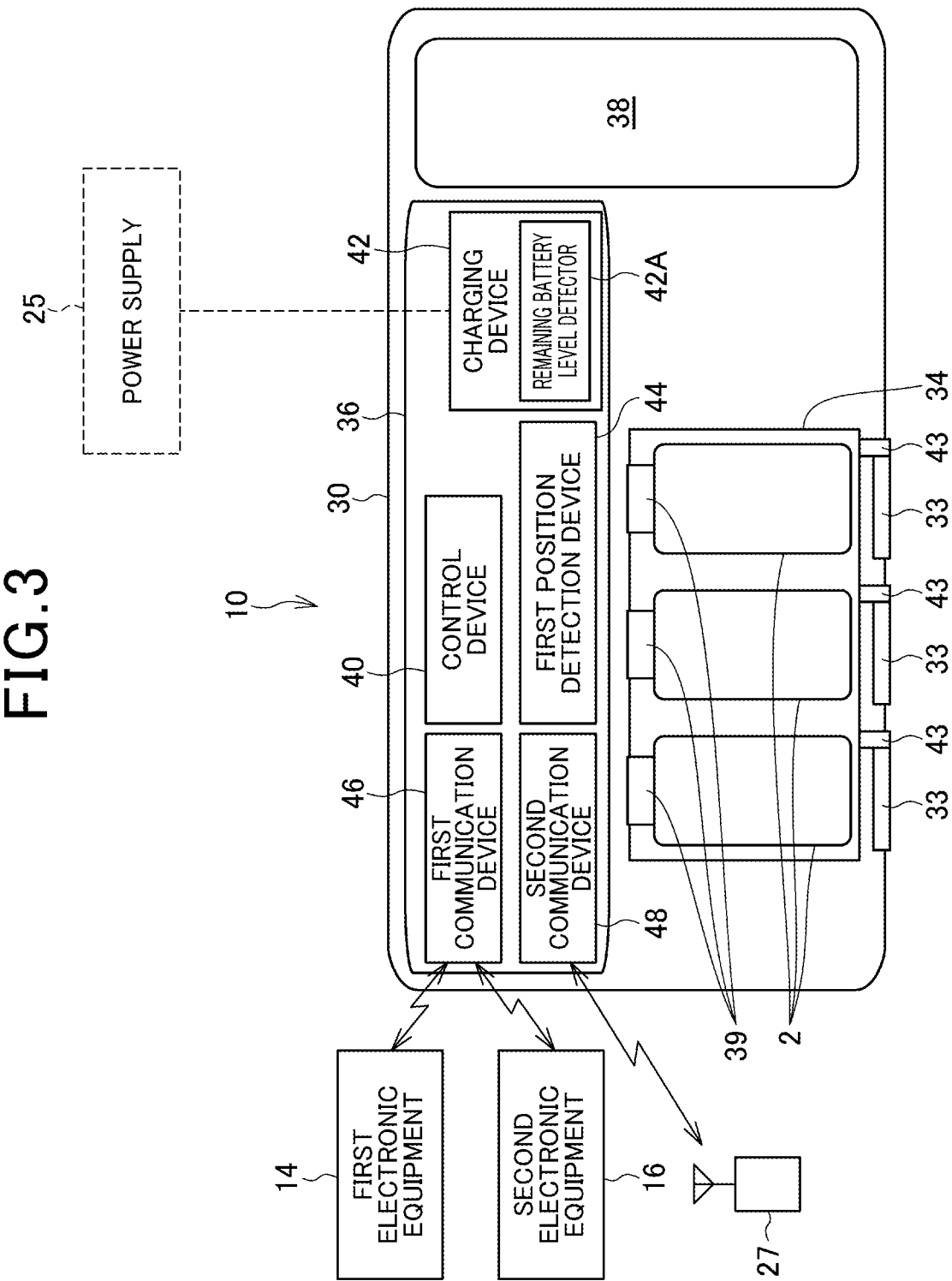
FIG. 3 is a view schematically illustrating a configuration of the battery station.

FIG. 3 is a view schematically illustrating a configuration of the battery station 10. Note that FIG. 3 is merely a schematic view and does not indicate accurate layout, shapes and sizes of the respective units.

The battery station 10 includes a chassis 30 that stores a plurality of (three in the illustrated example) power packs 2. Inside of the chassis 30, a holding unit 34 that detachably holds the power packs 2, an electrical unit 36 that stores various kinds of electric/electronic circuits, a storage space 38 in which the lender 4 (that is, the user of the moving body 8) can store baggage are provided. Further, in the electrical unit 36, a control device 40, a charging device 42, a first position detection device 44, a first communication device 46 and a second communication device 48 are stored.

The holding unit 34 includes a charging connector 39 that is electrically connected to electrodes of the power packs 2, and a lock mechanism 43 that makes it impossible to extract the power pack 2 in accordance with an instruction from the control device 40. The lock mechanism 43 includes, for example, an electric key that locks a cover body 33 of a power pack slot formed in the chassis 30 to make it impossible to open and close the cover body 33, or an electric control latching mechanism that catches the power pack 2 stored in the chassis 30 and makes it impossible to extract the power pack 2 as a mechanism that makes it impossible to extract the power pack 2.

The control device 40, which is a device that controls the respective units of the battery station 10, includes a computer including a processor such as a central processing unit (CPU) and a micro-processing unit (MPU), a memory device (also referred to as a primary storage device) such as a read only memory (ROM) and a random access memory (RAM), a storage device (also referred to as a secondary storage device) such as a solid state drive (SSD), and an interface circuit for connecting other devices and sensors. Further, by the processor executing a computer program stored in the memory device or the storage device, various kinds of functions of the battery station 10 are implemented. A functional configuration of the control device 40 will be described later. Note that the control device 40 may include a plurality of computers, and the computers may implement various kinds of functions in cooperation with each other.

The charging device 42, which is a device that charges the power pack 2 using power supplied from a power supply 25 as appropriate, includes a remaining battery level detector 42A (sensor) that detects the remaining battery level of the power pack 2. The power supply 25 is, for example, a commercial power supply or a charging facility. Note that the power supply 25 may be a stationary in-vehicle battery mounted on the moving body 8. Further, the charging device 42 may charge the power pack 2 using power branching from power for charging when the in-vehicle battery of the moving body 8 is charged. Further, the charging device 42 may be provided outside (for example, in the moving body 8, or the like) instead of being incorporated into the battery station 10.

The lender 4 can lend the power pack 2 after putting the power pack 2 into a fully charged condition in advance by causing the charging device 42 to operate. Note that the charging device 42 may automatically charge the respective power packs 2 held in the holding unit 34 while power is supplied from the power supply 25 and may maintain the power packs 2 in a fully charged condition.

The first position detection device 44, which is a device that detects a position of the battery station 10, includes a global navigation satellite system (GNSS) receiver that receives positioning signals emitted from a plurality of positioning satellites.

The first communication device 46 is a device including a transmitter and a receiver that transmits/receives data to/from each of the first electronic equipment 14 and the second electronic equipment 16.

In the present embodiment, the first communication device 46, the first electronic equipment 14 and the second electronic equipment 16 transmit/receive data by performing communication using a near field communication scheme. In other words, only in a case where the lender 4 who operates the first electronic equipment 14 and the borrower 6 who operates the second electronic equipment 16 are located near the battery station 10 that is a communication target (within a communication range of the first communication device 46), the first electronic equipment 14 and the second electronic equipment 16 can perform communication with the first communication device 46. Note that any communication protocol may be used in the near field communication scheme.

Note that in the present embodiment, detection results of the first position detection device 44 and the remaining battery level detector 42A, and various kinds of information such as a charging state related to the battery station 10 are transmitted from the first communication device 46 to the first electronic equipment 14 and transmitted from the first electronic equipment 14 to the management server 20.

The second communication device 48 is a wireless local area network (LAN) base station 27 (typically, a wireless rooter device) that is provided at a location where the lender 4 is located and connected to the communication network 22. The location where the lender 4 is located refers to a location where the lender 4 is usually located or a location where the lender 4 works, and, for example, a location of a home or an office. Further, in the present embodiment, in a case where the battery station 10 (moving body 8) is located within a communication range of the wireless LAN base station 27, and the second communication device 48 can perform communication with the management server 20 by way of the wireless LAN base station 27, predetermined data is directly transmitted/received to/from the management server 20 without by way of the first electronic equipment 14. The predetermined data includes a notification indicating inside of a wireless LAN communication range, the notification notifying the management server 20 that the battery station 10 is located within the communication range of the wireless LAN base station 27. This notification indicating inside of the wireless LAN communication range is transmitted quickly after the battery station 10 enters the communication range of the wireless LAN base station 27 and the second communication device 48 establishes a communication link with the wireless LAN base station 27.

Figure 4:
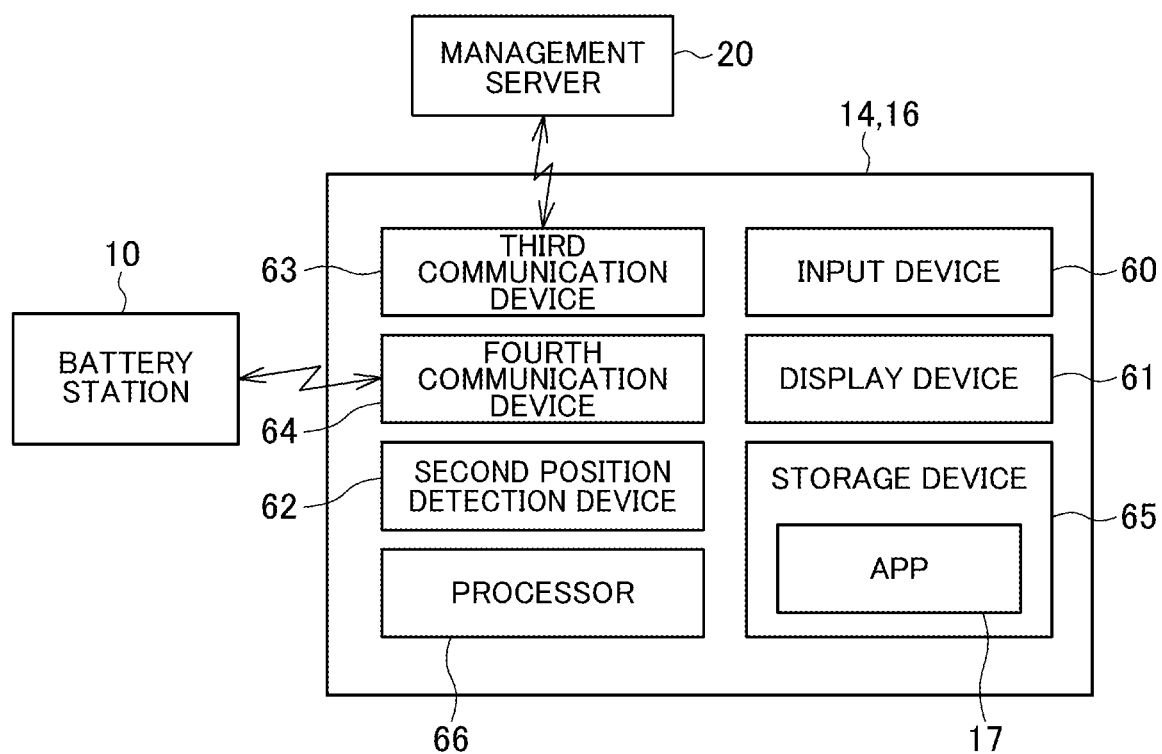
FIG. 4 is a view illustrating a device configuration of first electronic equipment and second electronic equipment.

FIG. 4 is a view illustrating a device configuration of the first electronic equipment 14 and the second electronic equipment 16.

Both the first electronic equipment 14 and the second electronic equipment 16 include an input device 60, a display device 61, a second position detection device 62, a third communication device 63, a fourth communication device 64, a storage device 65 and a processor 66.

The input device 60, which is a device that accepts operation input by a user such as the lender 4 and the borrower 6, includes, for example, a touch panel and an operation button.

The display device 61, which is a device that displays various kinds of information, includes, for example, a flat panel display.

The second position detection device 62, which is a device that detects a current position, includes a GNSS receiver in a similar manner to the first position detection device 44 described above. Note that in a case where the first electronic equipment 14 and the second electronic equipment 16 are equipment that performs communication with a mobile phone communication network, the second position detection device 62 may detect a current position on the basis of position information of a base station included in the mobile phone communication network.

The third communication device 63 is a device including a transmitter and a receiver that transmits/receives data to/from the management server 20 via the communication network 22.

The fourth communication device 64, which is a device including a transmitter and a receiver that transmits/receives data to/from the second communication device 48 included in the battery station 10, is a near field communication device that performs communication using the near field communication scheme in the present embodiment.

The storage device 65 is a device that stores an app 17. The app 17 is a computer program (application program) that causes the first electronic equipment 14 and the second electronic equipment 16 to operate as a client computer that receives the lending and borrowing service of the power pack 2 from the management server 20.

The processor 66, which is an arithmetic circuit such as a CPU and an MPU, implements various kinds of functions by executing the app 17. Note that functional configurations to be implemented by execution of the app 17 will be described later.

Figure 5:
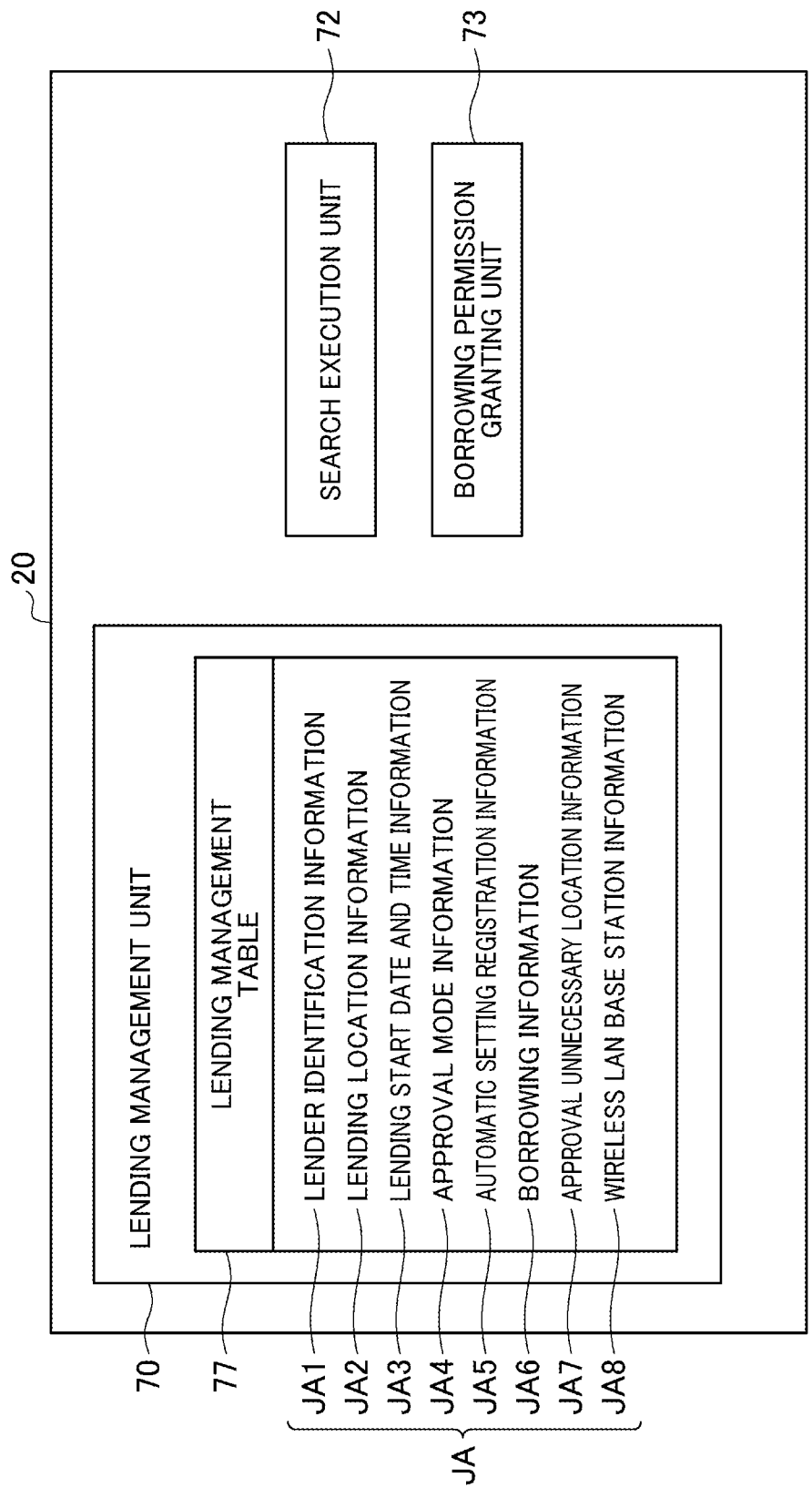
FIG. 5 is a view illustrating a functional configuration of a management server.

FIG. 5 is a view illustrating a functional configuration of the management server 20.

The management server 20 is a computer including a processor such as a CPU and an MPU, a memory device such as a ROM and a RAM, a storage device such as an SSD, and a communication device including a transmitter and a receiver that transmits/receives data to/from other computers through the communication network 22.

Further, by the processor executing the computer program stored in the memory device or the storage device, various kinds of functional configurations illustrated in FIG. 5 are implemented. Note that the management server 20 may include a plurality of computers, and the computers may implement the functional configurations illustrated in FIG. 5 in cooperation with each other.

As illustrated in FIG. 5, the management server 20 includes a lending management unit 70, a search execution unit 72, and a borrowing permission granting unit 73.

The lending management unit 70 manages implementation of lending of the power pack 2 by the lender 4 and stores a lending management table 77 that records information related to implementation of lending (hereinafter, referred to as "lending implementation information JA").

The lending implementation information JA includes lending identification information JA1, lending location information JA2, lending start date and time information JA3, approval mode information JA4, automatic setting registration information JA5, borrowing information JA6, approval unnecessary location information JA7 and wireless LAN base station information JA8, which are recorded in the lending management table 77 in association with each other by the lending management unit 70.

The lender identification information JA1 is information that uniquely identifies the lender 4.

The lending location information JA2 is information indicating a lending location (that is, a location where the moving body 8 to which the battery station 10 is attached is located) where the lender 4 implements lending of the power pack 2.

The lending start date and time information JA3 is information indicating lending start date and time at which lending of the power pack 2 is started at the lending location.

The approval mode information JA4 is information related to whether or not approval of the lender 4 is required for application for borrowing by the borrower 6. In the present embodiment, in the approval mode information JA4, one of an approval unnecessary mode and an approval necessary mode is recorded.

The approval unnecessary mode is an approval mode in which permission for borrowing which will be described later is granted to the borrower 6 without the necessity of approval of the lender 4. The approval necessary mode is an approval mode that requires approval of the lender 4 and is an approval mode in which permission for borrowing is granted to the borrower 6 after receiving approval of the lender 4.

The automatic setting registration information JA5 is information indicating whether or not the lender 4 permits for the management server 20 (lending management unit 70) to determine the approval mode (hereinafter, referred to as "automatic setting") on the basis of predetermined conditions which will be described later.

The lending management unit 70 records the approval mode designated in advance by the lender 4 in the approval mode information JA4 in a case where the lender 4 does not permit automatic setting. On the other hand, in a case where the lender 4 permits automatic setting, the lending management unit 70 determines the approval unnecessary mode as the approval mode in a case where the predetermined conditions are satisfied, determines the approval necessary mode as the approval mode in a case where the predetermined conditions are not satisfied, and records the determined approval mode in the approval mode information JA4.

In the present embodiment, the above-described predetermined conditions include a first condition to a third condition that improve user-friendliness of the lender 4 related to approval, and the lender 4 permits automatic setting based on these first to third conditions after grasping the first to the third conditions in advance.

The first condition is that the power pack 2 (battery station 10) to be lent by the lender 4 is located at a location (hereinafter, referred to as "an approval unnecessary location") designated by the lender 4 in advance.

The first condition is a condition provided for improving user-friendliness of the lender 4 by designating a location where the lender 4 himself/herself is less likely to use the power pack 2 as a predetermined location and by preventing occurrence of an approval request RC1 that is unnecessary for the lender 4 when the power pack 2 is lent at the predetermined location.

The second condition is that the power pack 2 is connected to the charging device 42.

In a case where the second condition is satisfied, the power pack 2 is charged by the charging device 42, so that a predetermined remaining battery level (so-called a fully charged condition) is maintained.

Thus, for example, even if the power pack 2 is exchanged by a certain borrower 6, and the remaining battery level of the power pack 2 is insufficient at a time point at which a request for borrowing is received, the power pack 2 is charged by the charging device 42. Thus, the lender 4 can grant permission for borrowing to the borrower 6 without the necessity of attention on the remaining battery level of the power pack 2 at the time point at which the request for borrowing is received by allowing the second condition.

In addition, in a case where the charging device 42 charges the power pack 2 with power of the power supply 25, it is predicted that the moving body 8 is stopped at a location where the lender 4 is located. In this case, the lender 4 himself/herself is less likely to use the power pack 2, and thus, the lender 4 can prevent occurrence of the unnecessary approval request RC1 by allowing the second condition, so that it is possible to improve user-friendliness of the lender 4.

The third condition is that the power pack 2 is stored in the battery station 10 provided in the moving body 8, the battery station 10 is located within the communication range of the wireless LAN base station 27 provided at the location where the lender 4 is located, and the moving body 8 is stopped.

The third condition is a condition provided for improving user-friendliness of the lender 4 by preventing occurrence of the approval request RC1 that is unnecessary for the lender 4 in a case where the lender 4 himself/herself is less likely to use the power pack 2.

In the present embodiment, whether or not the first condition and the second condition are satisfied is detected by the first electronic equipment 14 operated by the lender 4 and is transmitted from the first electronic equipment 14 to the management server 20 as a satisfied state notification RA3. Further, whether or not the third condition is satisfied is detected by the battery station 10 and is transmitted from the battery station 10 to the management server 20 by way of the wireless LAN base station 27 as a satisfied state notification RD1. Further, the lending management unit 70 determines the approval mode on the basis of these satisfied state notifications RA3 and RD1.

The borrowing information JA6 is information required for the borrower 6 to borrow the power pack 2 from the battery station 10 and in the present embodiment, is a unlock code for unlocking the lock mechanism 43 of the battery station 10.

The approval unnecessary location information JA7 is information indicating position information of the approval unnecessary location described above.

The wireless LAN base station information JA8 is information that uniquely specifies the above-described wireless LAN base station 27 and is, for example, a media access control (MAC) address, international mobile equipment identity (IMEI), or the like.

In the present embodiment, the lending implementation information JA is set by the lender 4 operating the first electronic equipment 14 and is transmitted from the first electronic equipment 14 to the management server 20. Note that a business operator may be notified of some pieces of information among the lending implementation information JA using other communication media such as a mail.

In a case where the search request RA4 is received from the second electronic equipment 16 operated by the borrower 6, the search execution unit 72 searches for the corresponding information from the lending implementation information JA recorded in the above-described lending management table 77 on the basis of the search condition designated by the second electronic equipment 16 and transmits a search result to the second electronic equipment 16. In the present embodiment, the search condition is "lending implemented around the current position of the second electronic equipment 16". Note that such a search condition is an example, and change and addition can be made as appropriate.

The search execution unit 72 of the present embodiment transmits the lending location information JA2, the lending start date and time information JA3 and the approval mode JA4 among the corresponding lending implementation information JA as a search result.

The borrowing permission granting unit 73 is a functional unit that, in a case where a borrowing permission request RA5 for requesting permission for borrowing of the power pack 2 by the borrower 6 is received from the second electronic equipment 16, grants permission for the borrowing to the borrower 6. In the present embodiment, the borrowing permission granting unit 73 grants permission for borrowing to the borrower 6 by transmitting the borrowing information JA6 to the second electronic equipment 16 of the borrower 6.

Further, in a case where permission for borrowing is granted to the borrower 6, the borrowing permission granting unit 73 grants permission for borrowing to the borrower 6 after receiving approval of the lender 4 or without receiving approval of the lender 4 in accordance with the approval mode determined by the lending management unit 70 (that is, the approval mode information JA4 recorded in the lending management table 77). In a case of receiving approval of the lender 4, the borrowing permission granting unit 73 transmits an approval request RC1 for granting permission for borrowing to the first electronic equipment 14. Then, the borrowing permission granting unit 73 grants permission for borrowing to the borrower 6 in a case where an approval result RA2 received from the first electronic equipment 14 indicates approval of the approval request RC1 and rejects the request for borrowing in a case where the approval result RA2 indicates rejection of the approval request RC1.

Figure 6:
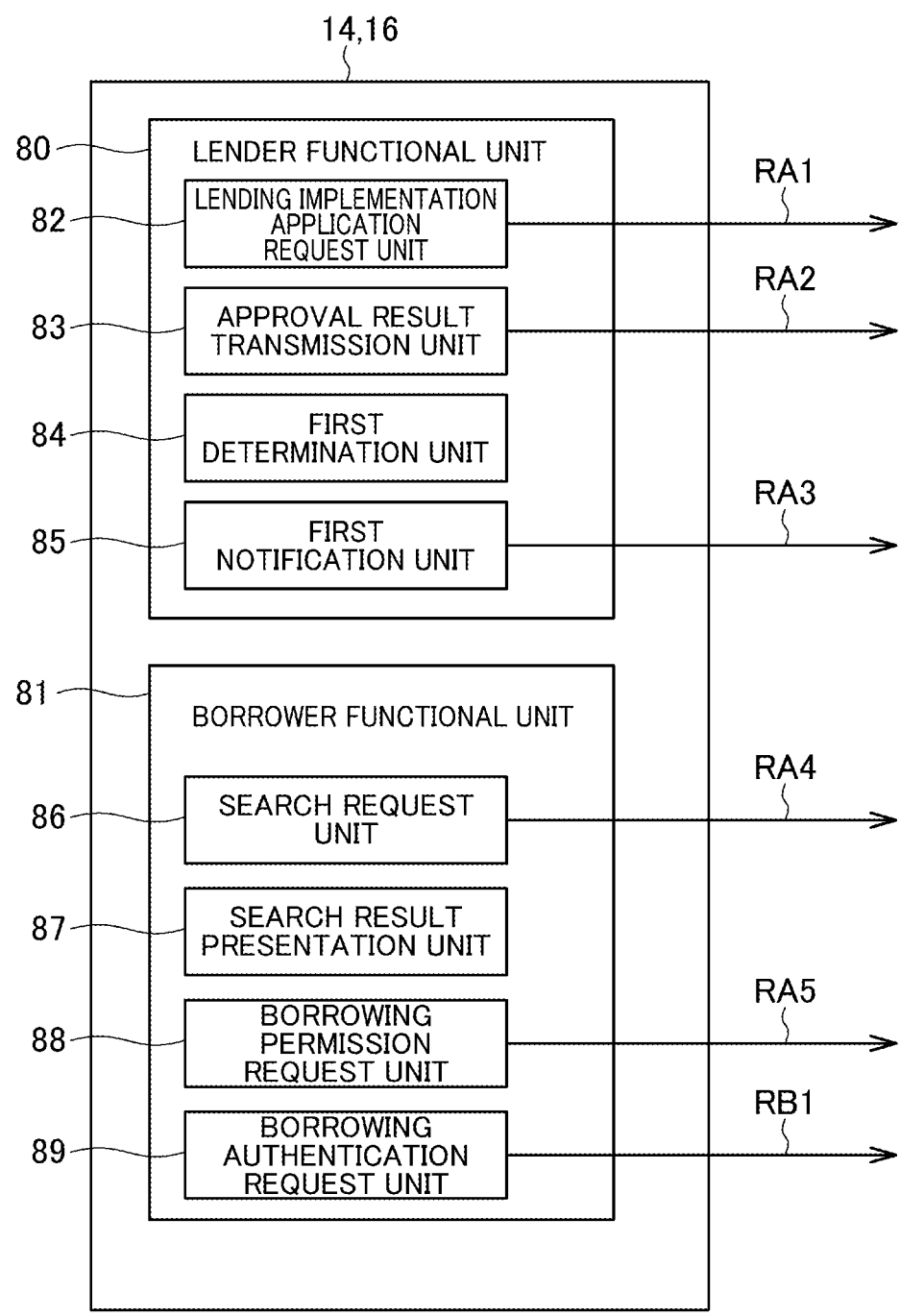
FIG. 6 is a view illustrating a functional configuration of the first electronic equipment and the second electronic equipment.

FIG. 6 is a view illustrating a functional configuration of the first electronic equipment 14 and the second electronic equipment 16.

As illustrated in FIG. 6, the first electronic equipment 14 and the second electronic equipment 16 function as a lender functional unit 80 and a borrower functional unit 81 by execution of the app 17.

The lender functional unit 80, which is a functional unit that provides functions related to lending of the power pack 2 to the lender 4, includes a lending implementation application request unit 82, an approval result transmission unit 83, a first determination unit 84 and a first notification unit 85.

The lending implementation application request unit 82 transmits a lending implementation application request RA1 to the management server 20 in response to operation by the lender 4. The lending implementation application request RA1 is a transmission message for applying for implementation of lending of the power pack 2 by the lender 4.

Further, the lending implementation application request unit 82 transmits to the management server 20, respective pieces of information included in the lending implementation information JA after including the information in the lending implementation application request RA1 or after transmitting the lending implementation application request RA1. However, the borrowing information JA6 included in the lending implementation information JA may be designated by the lender 4 or generated by the management server 20. Further, information such as the approval mode information JA4, the automatic setting registration information JA5, the approval unnecessary location information JA7 and the wireless LAN base station information JA8 may be designated by the lender 4 in advance before the lending implementation application request RA1 is transmitted.

The approval result transmission unit 83 generates the approval result RA2 with respect to the approval request RC1 received from the management server 20 on the basis of operation by the lender 4 and transmits the approval result RA2 to the management server 20.

The first determination unit 84 determines satisfied states of the predetermined conditions (in the present embodiment, the above-described first condition and second condition) related to automatic setting of the approval mode at an appropriate determination timing or with an appropriate determination period in the first electronic equipment 14.

Note that the satisfied state of the third condition among the predetermined conditions is determined by the battery station 10.

The satisfied state of the first condition is determined as follows. In other words, in a case where the battery station 10 exists within a near field communication range of the first electronic equipment 14, the first determination unit 84 acquires the current position of the battery station 10 and determines the satisfied state of the first condition by determining whether or not the current position of the battery station 10 matches a location indicated by the approval unnecessary location information JA7 (more accurately, whether or not a difference between the current position and the location is equal to or less than a predetermined value).

Further, the satisfied state of the second condition is determined as follows. In other words, in a case where the battery station 10 exists within the near field communication range of the first electronic equipment 14, the first determination unit 84 determines the satisfied state of the second condition by acquiring whether or not the power pack 2 is connected to the charging device 42 of the battery station 10 in a chargeable manner, from the battery station 10. Whether or not the power pack 2 is connected to the charging device 42 is determined by the control device 40 or the charging device 42 of the battery station 10 on the basis of whether or not the power pack 2 is connected to a charging connector 39 of the battery station 10.

The first notification unit 85 transmits the satisfied state notification RA3 indicating the satisfied states of the predetermined conditions at that time (that is, the respective satisfied states of the first condition and the second condition) to the management server 20 every time a determination result of the satisfied states of the predetermined conditions by the first determination unit 84 changes.

The borrower functional unit 81, which is a functional unit that provides functions related to borrowing of the power pack 2 to the borrower 6, includes a search request unit 86, a search result presentation unit 87, a borrowing permission request unit 88 and a borrowing authentication request unit 89.

The search request unit 86 transmits the search request RA4 and a search condition to the management server 20 in accordance with operation by the borrower 6.

Figure 7:
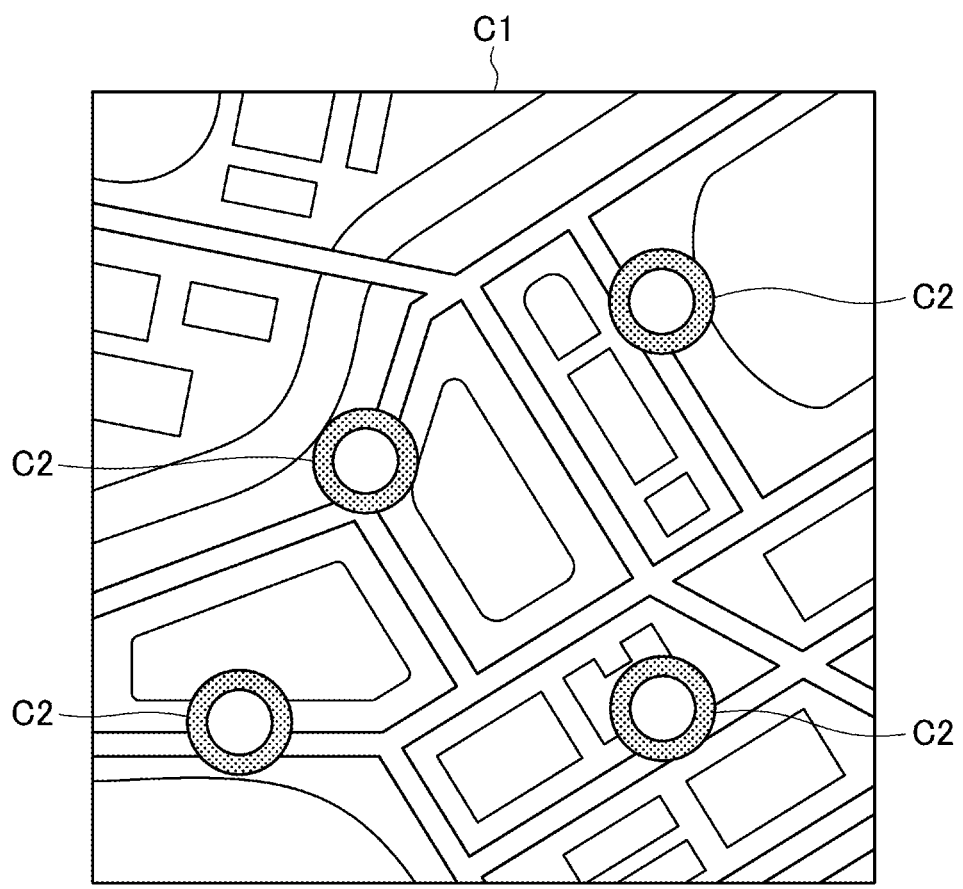
FIG. 7 is a view illustrating an example of a display aspect of a search result in the second electronic equipment.

The search result presentation unit 87 is a functional unit that provides a search result received from the management server 20 as a response message to the search request RA4 to the borrower 6. As illustrated in FIG. 7, the search result presentation unit 87 of the present embodiment displays lending icons C2 at positions indicated by the lending location information JA2 included in the search result on a map C1 around the current position. While not illustrated, the lending icon C2 includes display of lending start date and time and the approval mode, so that the borrower 6 can select desired lending in view of a distance from the current position of the borrower 6, or the like, on the basis of the display.

The borrowing permission request unit 88 transmits a borrowing permission request RA5 to the management server 20 in accordance with operation by the borrower 6. The borrowing permission request RA5 is a transmission message for requesting permission for borrowing of the power pack 2 to be lent at the lending location selected by the borrower 6. Further, the borrowing permission request unit 88 receives the above-described borrowing information JA6 from the management server 20 as a response message to the borrowing permission request RA5, thereby, permission for borrowing is granted to the borrower 6 from the management server 20.

The borrowing authentication request unit 89 transmits an unlock request RB1 to the battery station 10 through near field communication in accordance with operation by the borrower 6. The unlock request RB1 is a transmission message for requesting unlocking of the lock mechanism 43 described above to the battery station 10. Further, the borrowing authentication request unit 89 transmits the borrowing information JA6 described above to the battery station 10 through near field communication by including the borrowing information JA6 in the unlock request RB1 or after transmitting the unlock request RB1.

Note that the lender functional unit 80 and the borrower functional unit 81 may be respectively implemented in different apps. In this case, the first electronic equipment 14 executes an app in which the lender functional unit 80 is implemented, and the second electronic equipment 16 executes an app in which the borrower functional unit 81 is implemented.

Figure 8:
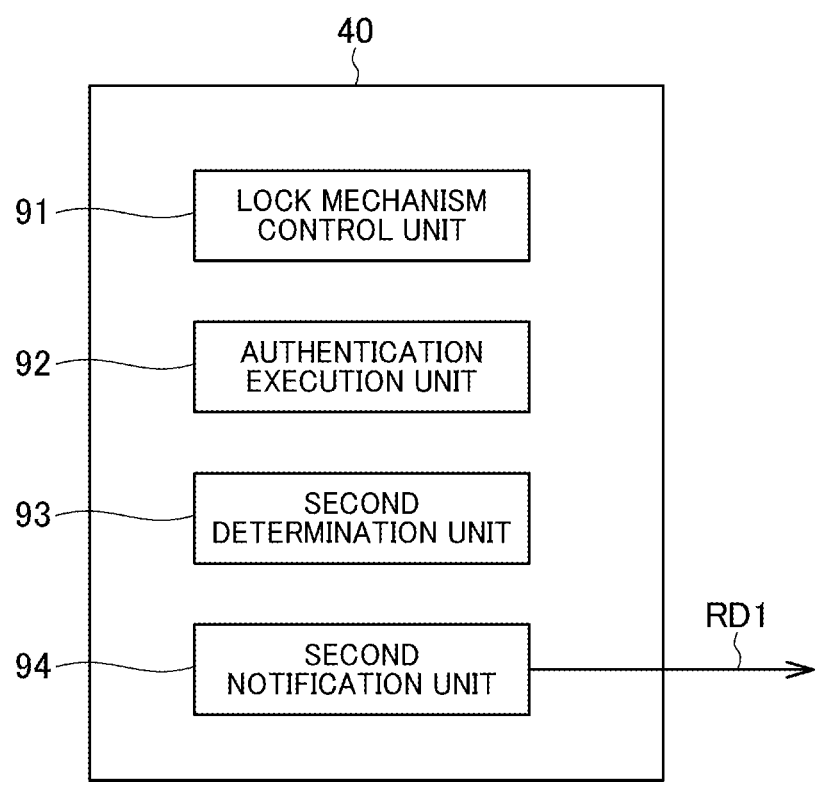
FIG. 8 is a view illustrating a functional configuration included in a control device of the battery station.

FIG. 8 is a view illustrating a functional configuration of the control device 40 of the battery station 10.

As illustrated in FIG. 8, the control device 40 includes a lock mechanism control unit 91, an authentication execution unit 92, a second determination unit 93 and a second notification unit 94.

The lock mechanism control unit 91 controls locking and unlocking of the lock mechanism 43.

The authentication execution unit 92 authenticates permission for borrowing by the borrower 6 on the basis of the borrowing information JA6 transmitted by the second electronic equipment 16 in a case where the unlock request RB1 described above is received from the second electronic equipment 16 through near field communication, and, in a case where permission for borrowing is valid, causes the lock mechanism control unit 91 to unlock the lock mechanism 43 so as to allow the borrower 6 to extract the power pack 2 from the battery station 10. The authentication is performed through collation between the borrowing information JA6 transmitted by the second electronic equipment 16 and the borrowing information JA6 recorded in the management server 20. In the present embodiment, information that is the same as or corresponds to the borrowing information JA6 recorded in the management server 20 is stored in a memory device, or the like, of the battery station 10.

The second determination unit 93 in the battery station 10 determines the satisfied state of the third condition related to automatic setting of the approval mode at an appropriate determination timing or with an appropriate determination period.

The satisfied state of the third condition is determined as follows. In other words, in a case where the battery station 10 exists within a communication range of the wireless LAN base station 27, the second communication device 48 establishes a communication link with the wireless LAN base station 27. In a case where such a communication link is established, the second determination unit 93 performs communication with the management server 20 by way of the wireless LAN base station 27 and acquires the wireless LAN base station information JA8 recorded in the lending management table 77. Then, the second determination unit 93 determines whether or not the battery station 10 is located within the communication range of the wireless LAN base station 27 provided at the location of the lender 4 by comparing the wireless LAN base station information JA8 with identification information of the wireless LAN base station 27 with which the communication link is established at the present moment. In addition, the second determination unit 93 determines whether or not the moving body 8 is stopped on the basis of temporal change of the current position detected by the first position detection device 44. The second determination unit 93 determines the satisfied state of the third condition by performing these kinds of determination.

The second notification unit 94 transmits the satisfied state notification RD1 indicating the satisfied state of the third condition at that time to the management server 20 every time a determination result of the satisfied state of the third condition by the second determination unit changes. However, in a case where near field communication cannot be performed with the first electronic equipment 14 due to the battery station 10 moving outside the communication range of the wireless LAN base station 27 or due to absence of the first electronic equipment 14 in the vicinity, communication cannot be performed with the management server 20, and thus, the second notification unit 94 cancels notification of the satisfied state notification RD1. In the management server 20, the lending management unit 70 regards a case where communication with the battery station 10 is cut off as change of the state to a state where the third condition is not satisfied.

Note that the satisfied state of the third condition may be determined by, for example, the lending management unit 70 of the management server 20 on the basis of information obtained by communication (communication by way of the wireless LAN base station 27) with the battery station 10.

Operation of the rental system 1 will be described next.

Figure 9:
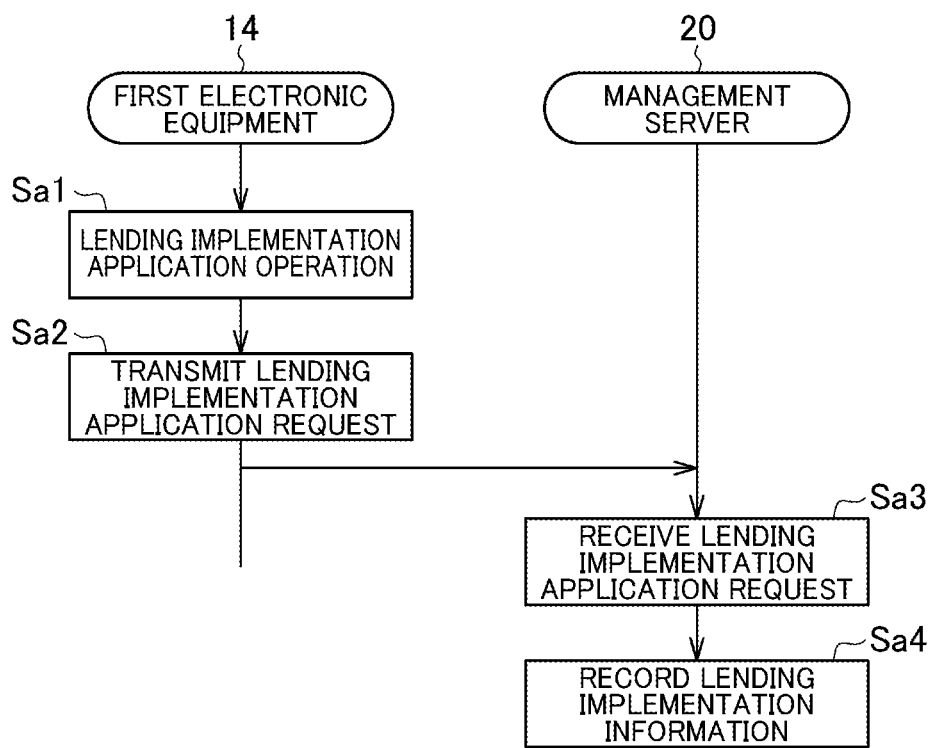
FIG. 9 is a view illustrating operation of the rental system in a case where a lender lends a power pack.

FIG. 9 is a view illustrating operation of the rental system 1 in a case where the lender 4 lends the power pack 2.

In a case where the lender 4 lends the power pack 2, the lender 4 performs operation (lending implementation application operation) of applying for implementation of lending on the first electronic equipment 14. In the lending implementation application operation, the lender 4 designates the approval mode and performs operation of permitting automatic setting by the management server 20 as necessary.

In a case where the lending implementation application operation is performed on the first electronic equipment 14 (step Sa1), the lending implementation application request unit 82 transmits the above-described lending implementation application request RA1 and respective pieces of information of the lending implementation information JA to the management server 20 (step Sa2).

In a case where the management server 20 receives the lending implementation application request RA1 (step Sa3), the lending management unit 70 records the lending implementation information JA in the lending management table 77 (step Sa4). By this means, implementation of lending applied for by the lender 4 is registered in the lending management table 77 and becomes a target for search by the borrower 6.

Figure 10:
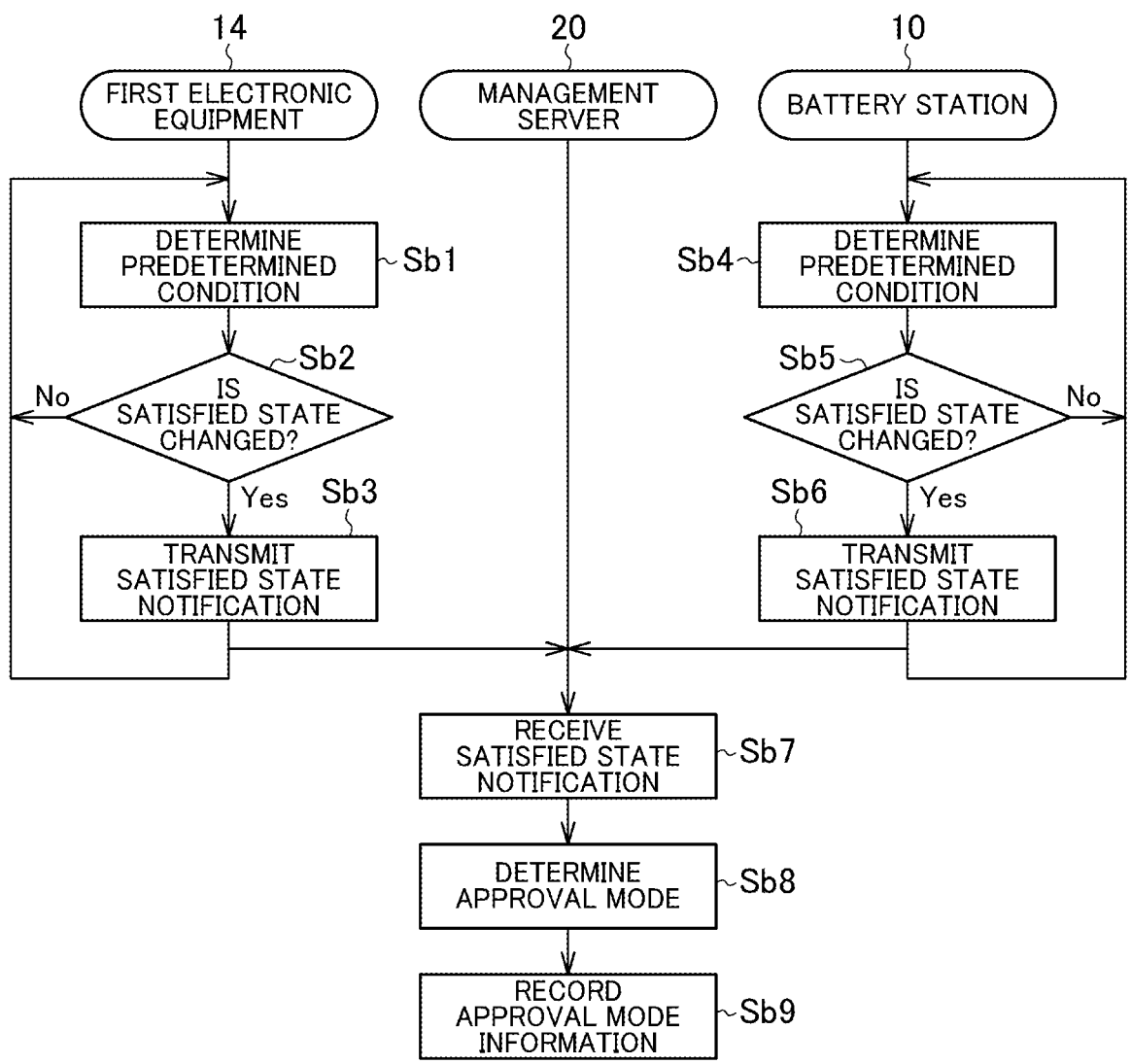
FIG. 10 is a view illustrating operation of the rental system in a case where automatic setting of an approval mode is permitted.

FIG. 10 is a view illustrating operation of the rental system 1 in a case where automatic setting of the approval mode is permitted.

In the first electronic equipment 14, the first determination unit 84 determines the satisfied states of the predetermined conditions (in the present embodiment, the above-described first condition and second condition) related to automatic setting at an appropriate determination timing or with an appropriate determination period (step Sb1). Then, in a case where the satisfied states change from the previous determination (step Sb2: Yes), the first notification unit 85 transmits the satisfied state notification RA3 indicating the changed satisfied states of the predetermined conditions (that is, the respective satisfied states of the first condition and the second condition) to the management server 20 (step Sb3).

Further, also in the battery station 10, in a similar manner to the first electronic equipment 14, the second determination unit 93 determines the satisfied state of the predetermined condition (in the present embodiment, the above-described third condition) related to automatic setting at an appropriate determination timing or with an appropriate determination period (step Sb4). Then, in a case where the satisfied state changes from the previous determination (step Sb5: Yes), the second notification unit 94 transmits the satisfied state notification RD1 indicating the changed satisfied state of the predetermined condition (that is, the satisfied state of the third condition) to the management server 20 (step Sb6).

In a case where the management server 20 receives the satisfied state notification RA3 transmitted from the first electronic equipment 14 or the satisfied state notification RD1 transmitted from the battery station 10 (step Sb7), the lending management unit 70 determines the approval mode in accordance with the satisfied states of the predetermined conditions at that time (step Sb8) and records the approval mode information JA4 indicating the determined approval mode in the lending management table 77 (step Sb9).

By this means, the approval mode in accordance with the satisfied states of the predetermined conditions is automatically set by the management server 20.

In the present embodiment, the predetermined conditions include the above-described first condition to third condition. Further, in the above-described step Sb8, the lending management unit 70 determines the approval unnecessary mode as the approval mode in a case where any one of the first to the third conditions is satisfied and determines the approval necessary mode as the approval mode in a case where none of the first to the third conditions is satisfied.

In this manner, in a case where the lender 4 permits automatic setting, in a case where the predetermined conditions (one or more of the first to the third conditions) are satisfied, the approval unnecessary mode is automatically determined as the approval mode. As a result of the approval mode being automatically set on the basis of the first to the third conditions, it is possible to minimize occurrence of the approval request RC1 that is unnecessary for the lender 4 (the first to the third conditions) and allow the lender 4 to perform lending without paying attention to the remaining battery level of the power pack 2 at a time point at which the lender 4 receives a request for borrowing (second condition).

Figure 11:
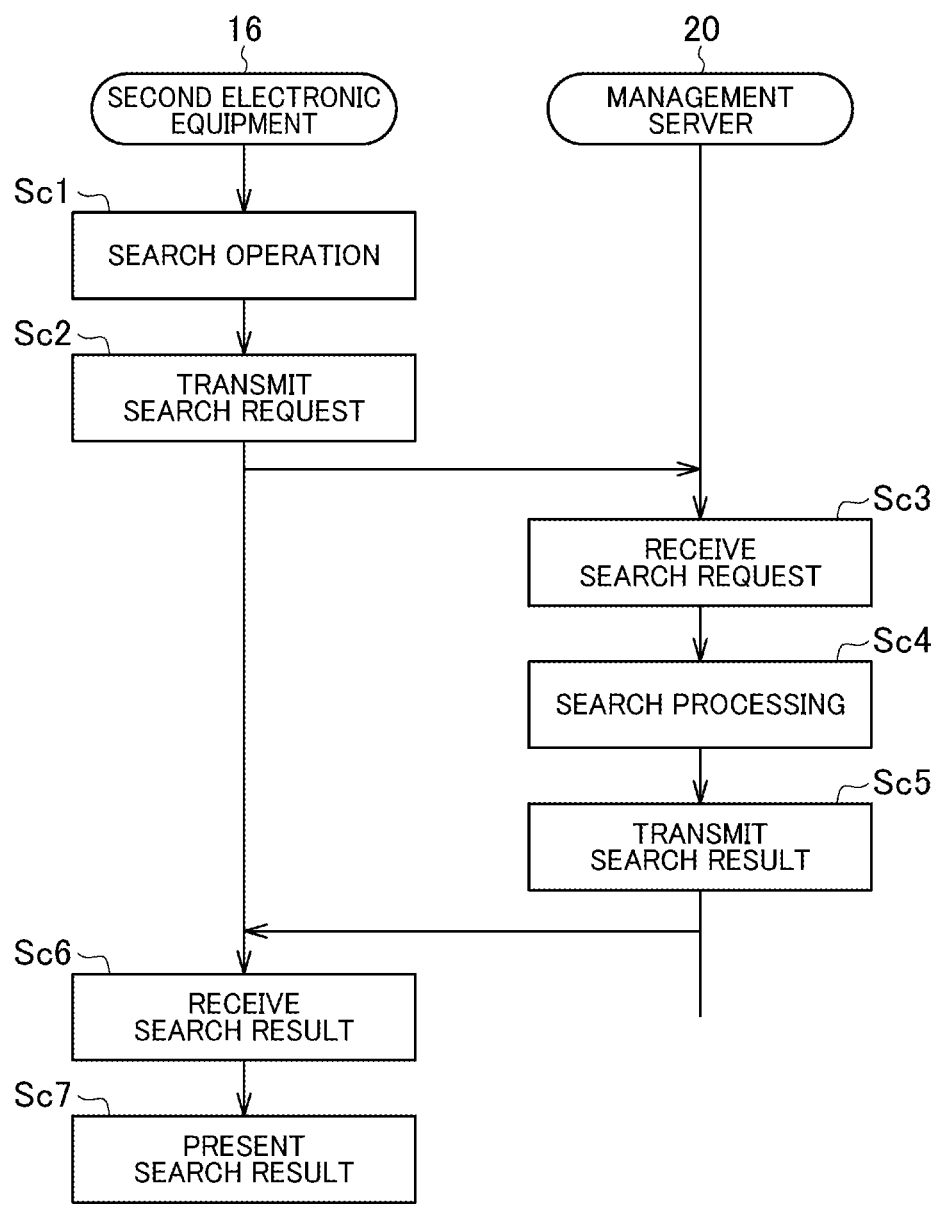
FIG. 11 is a view illustrating operation of the rental system in a case where a borrower performs search to borrow the power pack.

FIG. 11 is a view illustrating operation of the rental system 1 in a case where the borrower 6 performs search for borrowing the power pack 2.

In a case where the borrower 6 desires to borrow the power pack 2 with a sufficient remaining battery level because the remaining battery level of the power pack 2 mounted on the electric vehicle 24 becomes less while the electric vehicle 24 is traveling, the borrower 6 performs operation (search operation) of performing search while setting a "lending location where lending is being implemented around the current position" as the search condition, on the second electronic equipment 16.

In a case where the search operation is performed on the second electronic equipment 16 (step Sc1), the search request unit 86 transmits the search request RA4 for requesting search on the basis of the search condition and the current position of the second electronic equipment 16 to the management server 20 (step Sc2).

At the management server 20, in a case where the search request RA4 is received (step Sc3), the search execution unit 72 extracts the lending implementation information JA related to lending that is being implemented around the second electronic equipment 16 (a distance falls within a predetermined range) or lending to be implemented hereafter from the lending management table 77 on the basis of the current position of the second electronic equipment 16 and the lending location information JA2 of the lending implementation information JA recorded in the lending management table 77 (step Sc4: search processing). Then, the search execution unit 72 transmits a search result including the lending location information JA2, the lending start date and time information JA3 and the approval mode information JA4 of the extracted lending implementation information JA to the second electronic equipment 16 as a response message to the search request RA4 (step Sc5).

In a case where the second electronic equipment 16 receives the search result from the management server 20 (step Sc6), the search result presentation unit 87 presents the search result to the borrower 6 by displaying the above-described lending icons C2 (FIG. 7) indicating the lending locations, lending start date and time, and approval mode on the map C1 around the current position in a superimposed manner (step Sc7).

By this means, the borrower 6 can easily grasp the position of the lending location through display on the map, so that it is possible to improve user-friendliness of the borrower 6. In addition, the borrower 6 can select a lending location at which the power pack 2 is to be borrowed in consideration of a distance to the lending location, whether or not approval is necessary, and the like.

Figure 12:
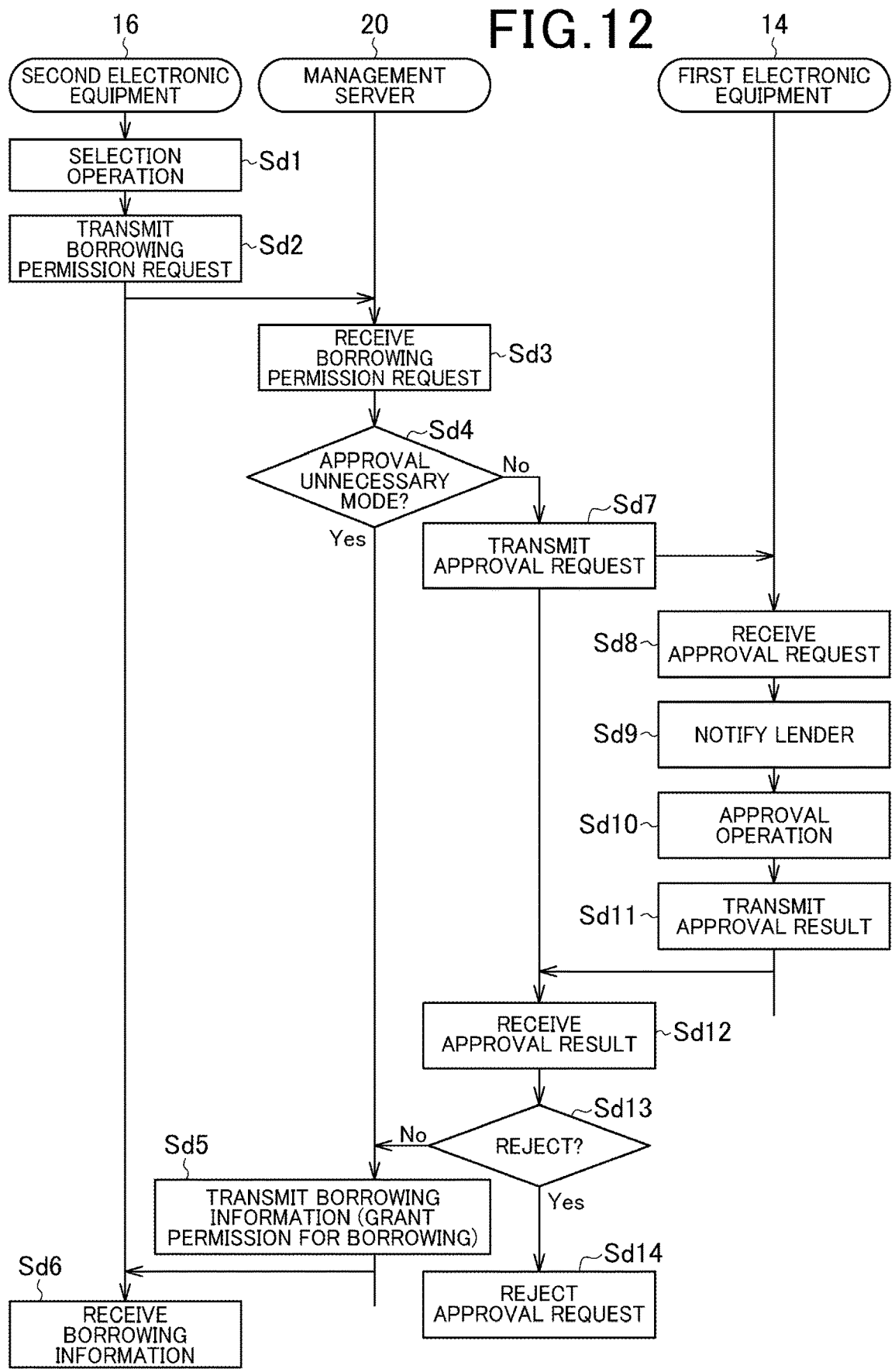
FIG. 12 is a view illustrating operation of the rental system in a case where the borrower selects a desired lending location from the search result and borrows the power pack.

FIG. 12 is a view illustrating operation of the rental system 1 in a case where the borrower 6 selects a desired lending location from the search result and borrows the power pack 2.

The borrower 6 performs operation (selection operation) of selecting a desired one of the lending icons C2 on the basis of information of the lending locations presented by the search result presentation unit 87, and the like, on the second electronic equipment 16.

In a case where the selection operation is performed on the second electronic equipment 16 (step Sd1), the borrowing permission request unit 88 transmits the above-described borrowing permission request RA5 for requesting permission for borrowing of the power pack 2 at the lending location associated with the lending icon C2 selected through the selection operation to the management server 20 (step Sd2).

In a case where the management server 20 receives the borrowing permission request RA5 (step Sd3), the borrowing permission granting unit 73 determines whether or not the approval mode determined by the lending management unit 70 is the approval unnecessary mode with reference to the approval mode information JA4 in the lending management table 77 (step Sd4).

In a case where the approval mode is the approval unnecessary mode (step Sd4: Yes), the borrowing permission granting unit 73 grants permission for borrowing to the borrower 6 without receiving approval of the lender 4 for the borrowing permission request RA5. In other words, the borrowing permission granting unit 73 reads out the borrowing information JA6 corresponding to permission for borrowing requested by the borrowing permission request RA5 from the lending management table 77 and transmits the borrowing information JA6 to the second electronic equipment 16 (step Sd5), and the second electronic equipment 16 receives the borrowing information JA6 (step Sd6). Permission for borrowing is granted to the borrower 6 from the management server 20 through transmission and reception of the borrowing information JA6.

On the other hand, in a case where the approval mode is the approval necessary mode (step Sd4: No), the borrowing permission granting unit 73 transmits the approval request RC1 for requesting the lender 4 to approve granting permission for borrowing to the borrower 6, to the first electronic equipment 14 of the lender 4 (step Sd7).

In a case where the first electronic equipment 14 receives the approval request RC1 (step Sd8), the approval result transmission unit 83 notifies the lender 4 that the approval request RC1 is received through display on the display device 61, or the like (step Sd9). Then, in a case where the lender 4 receives such a notification, the lender 4 performs operation (approval operation) of inputting whether or not to approve the approval request RC1, to the first electronic equipment 14. For example, in a case where the lender 4 has a reason for hesitating to lend the power pack 2, for example, the lender 4 himself/herself temporarily uses the power pack 2, the lender 4 inputs rejection of the approval request RC1 to the first electronic equipment 14. Further, in a case where the lender 4 has no reason for hesitating to lend the power pack 2, the lender 4 inputs approval of the approval request RC1 to the first electronic equipment 14.

Then, in a case where the approval operation is performed on the first electronic equipment 14 (step Sd10), the approval result transmission unit 83 transmits the approval result RC2 to the management server 20 on the basis of the approval operation (step Sd11).

In a case where the management server 20 receives the approval result RC2 (step Sd12), the borrowing permission granting unit 73 grants permission for borrowing to the borrower 6 (step Sd5) by transmitting the borrowing information JA6 to the second electronic equipment 16 in a case where the approval result RC2 indicates approval of the approval request RC1 (step Sd13: Yes) and rejects the borrowing permission request RA5 (step Sd14) in a case where the approval result RC2 indicates rejection of the approval request RC1 (step Sd12: No).

By this means, the lender 4 can control lending in accordance with the convenience of the lender 4, and the like, through a response to the approval request RC1 by designating the approval necessary mode as the approval mode.

Figure 13:
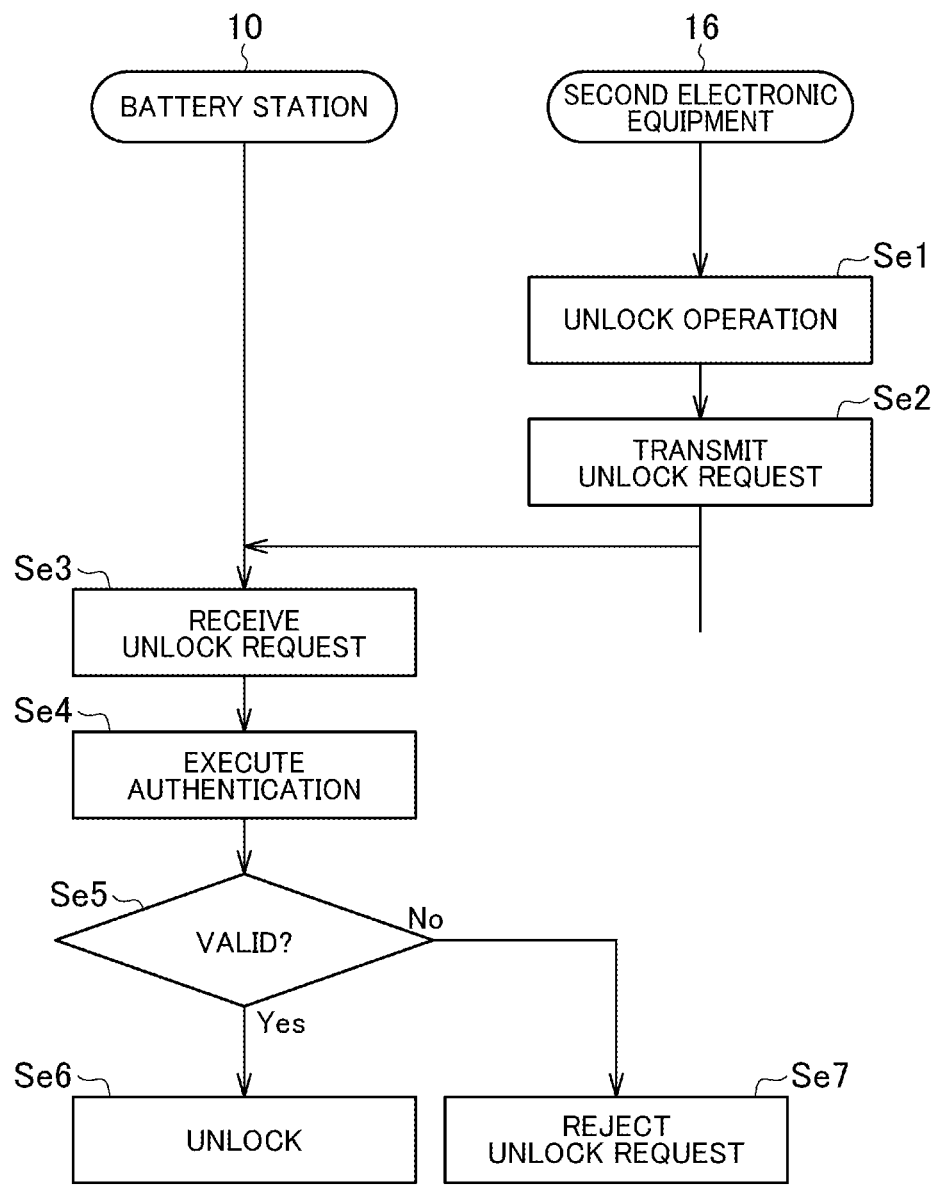
FIG. 13 is a view illustrating operation of the rental system 1 in a case where the borrower borrows the power pack at the lending location.

FIG. 13 is a view illustrating operation of the rental system 1 in a case where the borrower 6 borrows the power pack 2 at the lending location.

In a case where permission for borrowing is granted, the borrower 6 moves to the lending location by the electric vehicle 24, comes closer to the battery station 10 and performs operation (unlock operation) of unlocking the lock mechanism 43 of the battery station 10 on the second electronic equipment 16.

In a case where the unlock operation is performed on the second electronic equipment 16 (step Se1), the borrowing authentication request unit 89 transmits the above-described unlock request RB1 and the borrowing information JA6 to the battery station 10 through near field communication (step Se2).

In a case where the battery station 10 receives the unlock request RB1 (step Se3), the authentication execution unit 92 authenticates permission for borrowing by the borrower 6 on the basis of the borrowing information JA6 (step Se4). Then, in a case where the permission for borrowing is valid (step Se5: Yes), the authentication execution unit 92 causes the lock mechanism control unit 91 to unlock the lock mechanism 43 (step Se6: unlock). On the other hand, in a case where the permission for borrowing is not valid (step Se5: No), the authentication execution unit 92 rejects the request for unlocking with respect to the unlock request RB1 (step Se7).

Then, if the lock mechanism 43 is unlocked, the borrower 6 exchanges the power pack 2 by extracting the power pack 2 from the battery station 10 and storing the power pack 2 that is being used at the electric vehicle 24 by the borrower 6 in the battery station 10. As a result of this, borrowing by the borrower 6 is completed.

According to the above-described embodiment, the following effects are provided.

The management server 20 of the present embodiment is a computer that manages lending and borrowing of the power pack 2 detachably provided in the moving body 8 between the lender who lends the power pack 2 and the borrower 6 who borrows the power pack 2. The management server 20 includes the lending management unit 70 configured to determine an approval mode, which is one of the approval unnecessary mode in which permission for borrowing is granted to the borrower 6 without receiving approval of the lender 4 and the approval necessary mode in which permission for borrowing is granted to the borrower 6 after receiving approval of the lender 4, on the basis of designation by the lender 4 or the predetermined conditions. Further, the management server 20 includes the borrowing permission granting unit 73 configured to, in a case where a request for borrowing of the power pack 2 is received from the second electronic equipment 16 operated by the borrower 6, grant permission for borrowing to the borrower 6 by transmitting the borrowing information JA6 necessary for borrowing of the power pack 2 to the second electronic equipment 16. Then, the borrowing permission granting unit 73 grants permission for borrowing to the borrower 6 after receiving approval of the lender 4 or without receiving approval of the lender 4 in accordance with the approval mode determined by the lending management unit 70.

According to this configuration, the lender 4 can control lending in accordance with the convenience of the lender 4 by setting the approval unnecessary mode or the approval necessary mode, so that it is possible to improve user-friendliness.

In the management server 20, the predetermined conditions include the first condition that the power pack 2 to be lent by the lender 4 is located at a predetermined location designated by the lender 4 in advance. Further, the lending management unit 70 determines the approval unnecessary mode as the approval mode in a case where the first condition is satisfied and determines the approval necessary mode as the approval mode in a case where the first condition is not satisfied.

According to this configuration, by the lender 4 designating in advance a location where the lender 4 himself/herself is less likely to use the power pack 2 as the predetermined location, the approval unnecessary mode is automatically determined as the approval mode in a case where the power pack 2 is lent at the predetermined location. This prevents the lender 4 from receiving the approval request RC1 that is unnecessary for the lender 4 while lending is implemented at the predetermined location, so that it is possible to improve user-friendliness of the lender 4.

In the management server 20, the predetermined conditions include the second condition that the power pack 2 is connected to the charging device 42. Further, the lending management unit 70 determines the approval unnecessary mode as the approval mode in a case where the second condition is satisfied and determines the approval necessary mode as the approval mode in a case where the second condition is not satisfied.

According to this configuration, the lender 4 can perform lending without paying attention to the remaining battery level of the power pack 2 at a time point at which the lender 4 receives a request for borrowing, and occurrence of the approval request RC1 that is unnecessary for the lender 4 can be reduced, so that it is possible to improve user-friendliness of the lender 4.

In the management server 20, the predetermined conditions include the third condition that the power pack 2 is stored in the battery station 10 provided in the moving body 8, the battery station 10 is located within the communication range of the wireless LAN base station 27 associated with the lender 4, and the moving body 8 is stopped. Further, the lending management unit 70 determines the approval unnecessary mode as the approval mode in a case where the third condition is satisfied and determines the approval necessary mode as the approval mode in a case where the third condition is not satisfied.

According to this configuration, in a case where the moving body 8 is stopped near the location where the lender 4 is located, that is, in a case where the lender 4 himself/herself is less likely to use the power pack 2, the approval unnecessary mode is automatically determined as the approval mode. By this means, the lender 4 does not receive the approval request RC1 under the condition that the lender 4 himself/herself is less likely to use the power pack 2, so that it is possible to improve user-friendliness of the lender 4.

The management server 20 includes the search execution unit 72 configured to, in a case where the search condition is received from the second electronic equipment 16, transmit a search result related to lending that satisfies the search condition to the second electronic equipment 16. Further, the lending management unit 70 records the lending location of the power pack 2 and the approval mode related to lending of the power pack 2 in the lending management table 77 in association with each other, and the search result transmitted by the search execution unit 72 includes the lending location that satisfies the search condition and the approval mode associated with the lending location.

According to this configuration, the second electronic equipment 16 can display the lending location of the power pack 2 on the map on the basis of the search result, which allows the borrower 6 to easily grasp the position of the lending location through display on the map, so that it is possible to improve user-friendliness of the borrower 6. In addition, the borrower 6 can select the lending location at which the borrower 6 borrows the power pack 2 in consideration of a distance to the lending location, whether or not approval is necessary, and the like.

Note that the above-described embodiment is merely an example of one aspect of the present invention, any modification and application can be made within a range not deviating from the gist of the present invention, and aspects related to the embodiment, modifications and applications can be arbitrarily combined.

(Modification 1)

In the above-described embodiment, the moving body 8 may include a display device that displays the approval mode determined by the management server 20.

For example, in a case where the moving body 8 is a vehicle, the display device is provided at a location where the lender 4 can visually confirm when the lender 4 gets on the vehicle. As this display device, a device already existing in the moving body 8 can be used, and, for example, a meter panel that displays vehicle information such as speed, or a display panel of an in-vehicle device (such as, for example, a navigation device) provided in the moving body 8 can be used.

According to the present modification, the lender 4 can reliably grasp the approval mode at that time point through display of the display device when the lender 4 drives, boards or gets on the moving body 8.

(Modification 2)

In the above-described embodiment, the rental system 1 may be configured as follows, so that the borrower 6 can reliably borrow the power pack 2 with a remaining battery level equal to or greater than the predetermined value at desired time.

In other words, the second electronic equipment 16 accepts input of borrowing start time that is time at which the borrower 6 is scheduled to borrow the power pack 2 upon search operation and transmits the search condition that causes the management server 20 to search for a "lending location at which the borrower 6 can borrow the power pack 2 at the borrowing start time, the lending location existing around the current position of the second electronic equipment 16" to the management server 20.

On the other hand, in a case where the search condition includes the borrowing start time at which the power pack 2 is to be borrowed, the search execution unit 72 of the management server 20 transmits the lending location of the power pack 2 for which the remaining battery level is estimated to be equal to or greater than the predetermined value at the borrowing start time and the approval mode of the lending location to the second electronic equipment 16.

Note that the information related to the remaining battery level of the power pack 2 is, for example, managed by the management server 20 as follows. In other words, the battery station 10 transmits the remaining battery level of the power pack 2 and a period (hereinafter, referred to as a "charging period") required for the remaining battery level of the power pack 2 that is being charged to reach equal to or greater than the predetermined value to the management server 20 through the first electronic equipment 14 at an appropriate timing or with an appropriate period. Then, for example, the lending management unit 70 of the management server 20 receives the remaining battery level and the charging period and records these pieces of information in the lending management table 77. Management of the charging period of the power pack 2 allows specification of time at which the remaining battery level of the power pack 2 that is being charged is estimated to become equal to or greater than the predetermined value, so that the search execution unit 72 searches for a "lending location of the power pack 2 for which the remaining battery level is estimated to be equal to or greater than the predetermined value at the borrowing start time" on the basis of the time upon execution of the search.

According to the present modification, the borrower 6 can reliably borrow the battery with the remaining battery level of equal to or greater than the predetermined value at desired borrowing start time, so that it is possible to improve user-friendliness of the borrower 6.

(Other Modifications)

In the above-described embodiment, a communication frequency between the battery station 10 and the first electronic equipment 14 and the management server 20 may be made variable in accordance with a situation at that time to reduce consumption of power of the battery station 10.

For example, in a case where the moving body 8 is an electric vehicle, and the battery station 10 operates with power of the battery of the moving body 8, the battery station 10 transmits information on a charging state, and the like, of the battery station 10 to the management server 20 through the first electronic equipment 14 or the wireless LAN base station 27 at a timing at which a power switch of the moving body 8 is turned off and then lowers the communication frequency to reduce power consumption, thereby prevents decrease of the remaining battery level of the battery of the moving body 8. However, in a case where the power pack 2 is inserted/removed while the communication frequency is lowered, there is a high possibility that lender 4 is located near the battery station 10, and thus, the battery station 10 performs communication with the first electronic equipment 14 at a timing of the insertion/removal to make a notification of the information on the charging state, and the like, of the battery station 10.

On the other hand, in a case where the battery station 10 is connected to the power supply 25, the battery station 10 performs communication at a normal frequency.

In the above-described embodiment, the views illustrating functional configurations are schematic views illustrating components of the respective devices which are classified in accordance with main processing content to facilitate understanding of the present invention, and the components may be classified into more components in accordance with the processing content. Further, the components may be classified so that one component executes more kinds of processing.

(Configurations Supported by Disclosure of the Present specification)

Disclosure of the present specification supports the following configurations.

(Configuration 1)

A management server that manages lending and borrowing of a battery between a lender who lends the battery and a borrower who borrows the battery, the battery being detachably provided in a moving body, the management server including: a lending management unit configured to determine an approval mode on the basis of designation by the lender or a predetermined condition, the approval mode being one of an approval unnecessary mode in which permission for borrowing is granted to the borrower without receiving approval of the lender and an approval necessary mode in which the permission for borrowing is granted to the borrower after receiving the approval of the lender; and a borrowing permission granting unit configured to, in a case where a request for borrowing of the battery is received from second electronic equipment operated by the borrower, grant permission for the borrowing to the borrower by transmitting information necessary for borrowing of the battery to the second electronic equipment, in which the the borrowing to the borrower after receiving approval of the lender or without receiving approval of the lender in accordance with the approval mode determined by the lending management unit.

According to configuration 1, it is possible to improve user-friendliness of the lender.

(Configuration 2)

The management server according to configuration 1, in which the predetermined condition includes a condition that the battery to be lent by the lender is located at a predetermined location designated by the lender in advance, and the lending management unit determines the approval unnecessary mode as the approval mode in a case where the predetermined condition is satisfied and determines the approval necessary mode as the approval mode in a case where the predetermined condition is not satisfied.

According to configuration 2, it is possible to improve user-friendliness of the lender.

(Configuration 3)

The management server according to configuration 1, in which the predetermined condition includes a condition that the battery is connected to a charging device, and the lending management unit determines the approval unnecessary mode as the approval mode in a case where the predetermined condition is satisfied and determines the approval necessary mode as the approval mode in a case where the predetermined condition is not satisfied.

According to configuration 3, it is possible to improve user-friendliness of the lender.

(Configuration 4)

The management server according to configuration 3, in which the predetermined condition includes a condition that the battery is stored in a battery station provided in the moving body, the battery station is located within a communication range of a wireless communication device associated with the lender, and the moving body is stopped, and the lending management unit determines the approval unnecessary mode as the approval mode in a case where the predetermined condition is satisfied and determines the approval necessary mode as the approval mode in a case where the predetermined condition is not satisfied.

According to configuration 4, it is possible to improve user-friendliness of the lender.

(Configuration 5)

The management server according to any one of configurations 1 to 4, in which a display device that displays the approval mode is provided in the moving body.

According to configuration 5, the lender can grasp the approval mode at that time point from display on the display device.

(Configuration 6)

The management server according to any one of configurations 1 to 5, further including a search execution unit configured to, in a case where a search condition is received from the second electronic equipment, transmit a search result related to lending that satisfies the search condition to the second electronic equipment, in which the lending management unit records a lending location of the battery and the approval mode related to lending of the battery in association with each other, and the search result to be transmitted by the search execution unit includes a lending location that satisfies the search condition and an approval mode associated with the lending location.

According to configuration 6, it is possible to improve user-friendliness of the borrower.

(Configuration 7)

The management server according to configuration 6, in which in a case where the search condition includes borrowing start time at which the battery is to be borrowed, the search execution unit transmits a lending location of a battery for which a remaining battery level is estimated to be equal to or greater than a predetermined value at the borrowing start time, to the second electronic equipment.

According to configuration 7, the borrower can borrow the battery with the remaining battery level equal to or greater than the predetermined value at desired borrowing start time.

(Configuration 8)

A control method of a management server that manages lending and borrowing of a battery between a lender who lends the battery and a borrower who borrows the battery, the battery being detachably provided in a moving body, the control method including: a first step of determining an approval mode on the basis of designation by the lender or a predetermined condition, the approval mode being one of an approval unnecessary mode in which permission for borrowing is granted to the borrower without receiving approval of the lender and an approval necessary mode in which the permission for borrowing is granted to the borrower after receiving the approval of the lender; and a second step of, in a case where a request for borrowing of the battery is received from second electronic equipment operated by the borrower, granting permission for the borrowing to the borrower by transmitting information necessary for borrowing of the battery to the second electronic equipment, in which in the second step, permission for the borrowing is granted to the borrower after receiving approval of the lender or without receiving approval of the lender in accordance with the approval mode determined in the first step.

According to configuration 8, it is possible to improve user-friendliness of the lender.

REFERENCE SIGNS LIST 1 rental system
2 power pack (battery)
4 lender
6 borrower
8 moving body
10 battery station
14 first electronic equipment
16 second electronic equipment
20 management server
27 wireless LAN base station (wireless communication device)
42 charging device
70 lending management unit
72 search execution unit
73 borrowing permission granting unit
77 lending management table
JA lending implementation information

What is claimed is:

1. A management server that manages lending and borrowing of a battery between a lender who lends the battery and a borrower who borrows the battery, the battery being detachably provided in a moving body, the management server communicating with first electronic equipment operated by the lender and second electronic equipment operated by the borrower, via a communication network, the management server comprising:
    a lending management unit configured to determine an approval mode on a basis of a predetermined condition allowed by the lender, the approval mode being one of an approval unnecessary mode in which permission for the borrowing is granted to the borrower without receiving approval of the lender and an approval necessary mode in which the permission for the borrowing is granted to the borrower after receiving the approval of the lender; and
    a borrowing permission granting unit configured to, in a case where a request for the borrowing of the battery is received from the second electronic equipment operated by the borrower, grant the permission for the borrowing to the borrower by transmitting information necessary for the borrowing of the battery to the second electronic equipment, wherein when the approval mode determined by the lending management unit is the approval unnecessary mode, the borrowing permission granting unit grants the permission for the borrowing to the borrower without receiving the approval of the lender, when the approval mode determined by the lending management unit is the approval necessary mode, the borrowing permission granting unit displays, on a first display of the first electronic equipment, an approval request for requesting the approval of the lender, and receives the approval of the lender and grants the permission for the borrowing to the borrower, the predetermined condition includes a condition that the battery is connected to a charging device, the battery is stored in a battery station provided in the moving body, and the battery station is located within a communication range of a wireless communication device associated with the lender, and the lending management unit determines the approval unnecessary mode as the approval mode in a case where the predetermined condition is satisfied and determines the approval necessary mode as the approval mode in a case where the predetermined condition is not satisfied, and the battery station includes a lock mechanism configured to physically prevent removal of the battery from the battery station, and a lock mechanism control unit configured to unlock the lock mechanism only upon receiving an unlock request from the second electronic equipment, the unlock request only being sent when the borrowing permission granting unit grants the permission for the borrowing to the borrower.

2. The management server according to claim 1, wherein the predetermined condition further includes a condition that the battery to be lent by the lender is located at a predetermined location designated by the lender in advance, and the lending management unit determines the approval unnecessary mode as the approval mode in a case where the predetermined condition is satisfied and determines the approval necessary mode as the approval mode in a case where the predetermined condition is not satisfied.

3. The management server according to claim 1, wherein a display device that displays the approval mode is provided in the moving body.

4. The management server according to claim 1, further comprising:

a search execution unit configured to, in a case where a search condition is received from the second electronic equipment, transmit a search result related to lending that satisfies the search condition to the second electronic equipment, wherein the lending management unit records a lending location of the battery and the approval mode related to the lending of the battery in association with each other, and the search result to be transmitted by the search execution unit includes a lending location that satisfies the search condition and an approval mode associated with the lending location.

5. The management server according to claim 4, wherein in a case where the search condition includes a borrowing start time at which the battery is to be borrowed, the search execution unit transmits a lending location of a battery for which a remaining battery level is estimated to be equal to or greater than a predetermined value at the borrowing start time, to the second electronic equipment.

6. A control method of a management server that manages lending and borrowing of a battery between a lender who lends the battery and a borrower who borrows the battery, the battery being detachably provided in a moving body, the management server communicating with first electronic equipment operated by the lender and second electronic equipment operated by the borrower, via a communication network, the control method comprising:

a first step of determining an approval mode on a basis of a predetermined condition allowed by the lender, the approval mode being one of an approval unnecessary mode in which permission for the borrowing is granted to the borrower without receiving approval of the lender and an approval necessary mode in which the permission for the borrowing is granted to the borrower after receiving the approval of the lender;

a second step of, in a case where a request for the borrowing of the battery is received from the second electronic equipment operated by the borrower, granting the permission for the borrowing to the borrower by transmitting information necessary for the borrowing of the battery to the second electronic equipment, wherein when the approval mode determined in the first step is the approval unnecessary mode, in the second step, the permission for the borrowing is granted to the borrower without receiving the approval of the lender, and when the approval mode determined in the first step is the approval necessary mode, in the second step, an approval request for requesting the approval of the lender is displayed on a first display of the first electronic equipment, and the approval of the lender is received and the permission for the borrowing is granted to the borrower, the predetermined condition includes a condition that the battery is connected to a charging device, the battery is stored in a battery station provided in the moving body, and the battery station is located within a communication range of a wireless communication device associated with the lender, and the approval unnecessary mode is determined as the approval mode in a case where the predetermined condition is satisfied and the approval necessary mode is determined as the approval mode in a case where the predetermined condition is not satisfied, and the battery station includes a lock mechanism configured to physically prevent removal of the battery from the battery station, and a lock mechanism control unit configured to unlock the lock mechanism only upon receiving an unlock request from the second electronic equipment; and a third step of, when the permission for the borrowing to the borrower is granted in the second step, transmitting the unlock request from the second electronic equipment to the lock mechanism control unit and unlocking the lock mechanism using the lock mechanism control unit.

* * * * *